(12) United States Patent
Amthor et al.

(10) Patent No.: US 11,689,028 B2
(45) Date of Patent: Jun. 27, 2023

(54) METHOD FOR CONTROLLING AN EXCHANGE OF ENERGY BETWEEN ENERGY SUB-SYSTEMS IN ADJUSTED HARMONISED CONDITIONS; CONTROL CENTRE; ENERGY SYSTEM; COMPUTER PROGRAM; AND STORAGE MEDIUM

(71) Applicant: Siemens Aktiengesellschaft, Munich (DE)

(72) Inventors: Arvid Amthor, Grabfeld OT Nordheim (DE); Michael Metzger, Markt Schwaben (DE); Sebastian Thiem, Neustadt an der Aisch (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/272,016

(22) PCT Filed: Aug. 19, 2019

(86) PCT No.: PCT/EP2019/072092
§ 371 (c)(1),
(2) Date: Feb. 26, 2021

(87) PCT Pub. No.: WO2020/043522
PCT Pub. Date: Mar. 5, 2020

(65) Prior Publication Data
US 2021/0351594 A1    Nov. 11, 2021

(30) Foreign Application Priority Data
Aug. 31, 2018 (DE) ............... 10 2018 213 862.1

(51) Int. Cl.
*H02J 3/46* (2006.01)

(52) U.S. Cl.
CPC ...................... *H02J 3/46* (2013.01)

(58) Field of Classification Search
CPC . H02J 3/46; H02J 2203/20; H02J 3/06; Y02E 40/70; Y02E 60/00; Y04S 10/50; Y04S 40/20
(Continued)

(56) References Cited

U.S. PATENT DOCUMENTS 11,145,011 B2 * 10/2021 Eda .................. G06Q 50/06
2013/0144451 A1   6/2013 Kumar .................. 700/291
(Continued)

FOREIGN PATENT DOCUMENTS

CN          105058396 A    11/2015    ............. B25J 13/06
DE    10 2012 221 291       5/2014    ............. G06Q 20/08
(Continued)

OTHER PUBLICATIONS

Search Report for International Application No. PCT/EP2019/072092, 4 pages, dated Oct. 21, 2019.
(Continued)

*Primary Examiner* — Richard Tan
(74) *Attorney, Agent, or Firm* — Slayden Grubert Beard PLLC

(57) ABSTRACT

Various embodiments include a method for controlling an exchange of energy in an energy system having multiple energy subsystems each connected to one another for the purpose of exchanging energy, the method comprising: receiving respective supply data at a control center from the energy subsystems, wherein the supply data comprise respective remuneration conditions of the applicable energy subsystem for receiving and/or providing energy; determining optimum conditions on the basis of the supply data of the energy subsystems; and controlling the exchange of energy
(Continued)

between the energy subsystems on the basis of the optimum conditions with the control center.

12 Claims, 2 Drawing Sheets

(58) Field of Classification Search
USPC .......................................................... 307/20
See application file for complete search history.

(56) References Cited

U.S. PATENT DOCUMENTS

| | | | |
|---|---|---|---|
| 2014/0365022 A1 | 12/2014 | Ghosh | ........................... 700/291 |
| 2015/0286973 A1 | 10/2015 | Becher | ................... G06Q 10/06 |
| 2018/0173171 A1 | 6/2018 | Lin | ...................... G05B 13/021 |
| 2019/0086891 A1* | 3/2019 | Kawamoto | ............... H02J 3/32 |
| 2019/0236726 A1* | 8/2019 | Unagami | ........... G06Q 20/3825 |

FOREIGN PATENT DOCUMENTS

| | | | | |
|---|---|---|---|---|
| KR | 20110034888 A | 4/2011 | ............. | G06F 19/00 |
| KR | 20180083606 A | 7/2018 | ............. | G06Q 30/06 |

OTHER PUBLICATIONS

Wikipedia "Stromhandel"; pp. 1-7, Bembeitungsstand: Dec. 16, 2017 um 14:12 Uhr; URL: https://de.wikipedia.org/w/index.php?title=Stromhandel&oldid=172019118.
Korean Office Action, Application No. 2022092126819, 5 pages, dated Nov. 28, 2022.

\* cited by examiner

METHOD FOR CONTROLLING AN EXCHANGE OF ENERGY BETWEEN ENERGY SUB-SYSTEMS IN ADJUSTED HARMONISED CONDITIONS; CONTROL CENTRE; ENERGY SYSTEM; COMPUTER PROGRAM; AND STORAGE MEDIUM

CROSS-REFERENCE TO RELATED APPLICATIONS

This application is a U.S. National Stage Application of International Application No. PCT/EP2019/072092 filed Aug. 19, 2019, which designates the United States of America, and claims priority to DE Application No. 10 2018 213 862.1 filed Aug. 31, 2018, the contents of which are hereby incorporated by reference in their entirety.

TECHNICAL FIELD

The present disclosure relates to energy systems. Various embodiments include methods for controlling an exchange of energy in an energy system having multiple energy subsystems that are each connected to one another for the purpose of exchanging energy, control centers, energy systems having multiple energy subsystems and a control center, and/or computer programs and storage media.

BACKGROUND

Electrical energy should be produced and consumed on an electricity grid in a balanced ratio. Modest grid-based storage capabilities for electrical energy mean in particular that it is necessary for electrical energy to be produced at the same time as it is consumed. In particular the building of decentralized small power stations, for example photovoltaic installations, cogeneration units, biogas installations, wind turbines for power generation and stationary storage systems, in particular battery stores, necessitates simple and efficient control or feedback control.

SUMMARY

The teachings of the present disclosure describe improved methods for controlling an exchange of electrical energy. For example, some embodiments include a method for controlling an exchange of energy in an energy system (1) having multiple energy subsystems (3) that are each connected to one another for the purpose of exchanging energy, having the steps of: a control center (2) receiving respective supply data (6) from the energy subsystems (3), wherein the supply data (6) comprise respective remuneration conditions of the applicable energy subsystem (3) for receiving and/or providing energy, determining optimum conditions (7) on the basis of the supply data (6) of all energy subsystems (3) of the energy system (1), and controlling the exchange of energy between the energy subsystems (3) on the basis of the optimum conditions (7).

In some embodiments, the determining of the optimum conditions (7) is performed by taking into consideration a maximized exchange of energy.

In some embodiments, a demanded or offered amount of energy (10) for at least one remuneration condition is received on the basis of the supply data (6) of the respective energy subsystem (3).

In some embodiments, the control center (2) takes the supply data (6) as a basis for determining a total amount of energy (11) offered by the energy subsystems (3) and a total amount of energy (12) demanded by the energy subsystems (3) for different remuneration conditions.

In some embodiments, the respective supply data (6) comprise a price elasticity curve (10) for the respective energy subsystem (3).

In some embodiments, the control center (2) combines, in particular adds, the price elasticity curves (10) of the energy subsystems (3).

In some embodiments, the optimum conditions (7) stipulate the same remuneration conditions for each of the energy subsystems (3).

In some embodiments, the cited method steps are each performed in succession for successive discrete time intervals (t).

In some embodiments, the respective supply data (6) generally have validity only for a single one of the time intervals (t) and the determining of the optimum conditions (7) is performed in succession for successive discrete time intervals (t) in each case on the basis of the supply data (6) that are valid for the respective time interval (t).

In some embodiments, one of the energy subsystems (3) determines the exchange of energy in one or more time intervals (t−1) that precede a subsequent time interval (t) and uses said exchange of energy to create respective supply data (6) for the subsequent time interval (t).

In some embodiments, supply data (6) are received for a time interval (t+1) that is directly subsequent to a preceding time interval (t) only after the exchange of the energy between the energy subsystems (3) for the preceding time interval (t) has been determined.

As another example, some embodiments include a control center (2) configured to perform a method as claimed in one of the preceding claims.

As another example, some embodiments include an energy system (1) having multiple control units (4) for controlling a respective energy subsystem (3) with regard to an exchange of energy of the energy subsystem (3) with other energy subsystems (3), and a control center (2) for receiving respective supply data (6) from the energy subsystems (3), wherein the supply data (6) comprise respective remuneration conditions of the applicable energy subsystem (3) for receiving and/or providing energy, for determining optimum conditions (7) for all energy subsystems (3) of the energy system (1) on the basis of the supply data (6), and for controlling an exchange of energy between the energy subsystems (3) on the basis of the optimum conditions (7).

As another example, some embodiments include a computer program loadable directly into a memory of a control center (2) of an energy system (1), having program code means in order to carry out the steps of the method for controlling an exchange of energy as described above when the program is executed in the control center (2) of the energy system (1).

As another example, some embodiments include a storage medium having electronically readable control information stored thereon that comprises at least one computer program as described above and is designed such that it performs a method for controlling an exchange of energy as described herein when the storage medium is used in a control center (2) of an energy system (1).

BRIEF DESCRIPTION OF THE DRAWINGS

The teachings of the present disclosure are explained in greater detail with reference to the accompanying drawings, in which.

DETAILED DESCRIPTION

Figure 1:
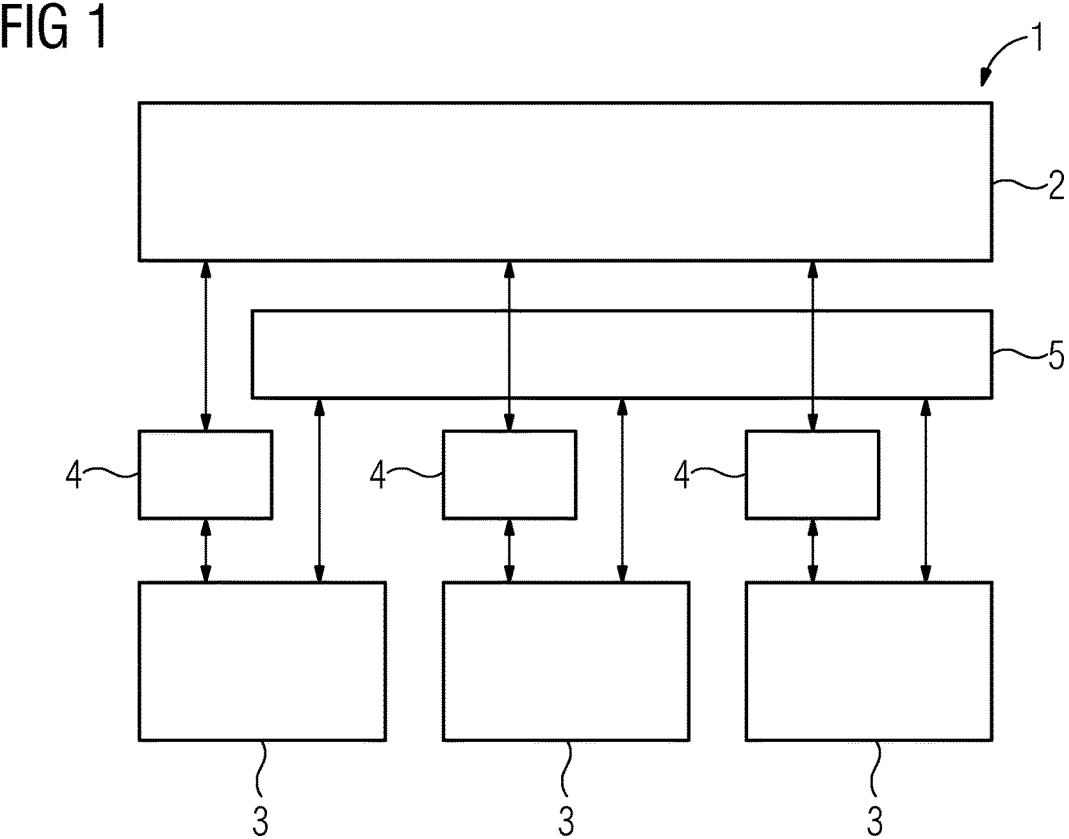
FIG. 1 shows a block diagram of multiple energy subsystems and a control center incorporating teachings of the present disclosure.

Some embodiments of the teachings herein include methods for controlling an exchange of energy in an energy system having multiple energy subsystems that are each connected to one another for the purpose of exchanging the energy. An example method comprises the following steps:
 a control center receiving respective supply data from the energy subsystems, wherein the supply data comprise respective remuneration conditions of the applicable energy subsystem for receiving and/or providing energy,
 the control center determining optimum conditions on the basis of the supply data of all energy subsystems of the energy system, and
 controlling the exchange of energy between the energy subsystems on the basis of the optimum conditions.

In some embodiments, the energy is in electrical energy. However, it can alternatively be thermal energy. In other words the term "energy" means for example "electrical energy", "thermal energy" or "cold energy". The text below refers to "electrical energy". This is not intended to limit the scope of the disclosure; on the contrary, all of the embodiments below relating to electrical energy apply analogously to other energy forms too.

The aforementioned energy system can comprise the control center and the multiple energy subsystems. In some embodiments, the energy subsystems to be controlled by a respective control unit. In this case the communication of the respective energy subsystem with the control center is effected by the applicable control unit of the respective energy subsystem. In this case the energy system can comprise for example multiple control units for each of the energy subsystems and the control center. The supply data can then be received from the respective control units of the energy subsystems. The exchange of electrical energy between the energy subsystems can be controlled by controlling the respective control units of the energy subsystems.

The energy subsystems can each extend over a single household, over a single building or over a factory. Each of the energy subsystems can comprise for example one or more of the following installations: photovoltaic installation, biogas installations, cogeneration unit, electrical energy store (in particular stationary battery store), electric vehicle, wind generator. Additionally, the energy subsystems can comprise pure consumers of electrical energy such as for example industrial installations, cooking appliances, washing machines or arbitrary household appliances. The energy system may be formed for example from the energy subsystems of a region, a city, a community, a district or a region defined in another manner. There is in particular provision for the energy system to extend over an area of suitable size. In particular there is provision for multiple physically separate energy systems to coexist in a country. The control center can be a central server of the energy system. The server can communicate with the energy subsystems, in particular with the control units thereof, for example via the Internet. The control center does not necessarily have to be in the region covered by the energy system.

The supply data can indicate the remuneration conditions under which a respective energy subsystem is prepared to receive and/or provide electrical energy. The remuneration conditions can comprise for example a price for an amount of energy. For example, the supply data therefore contain a quote for a specific amount of energy at a specific price or a demand for (that is to say to purchase) a specific amount of energy at a specific price.

The respective supply data of all energy subsystems are taken as a basis for the control center to determine the optimum conditions. In other words it is determined for which remuneration conditions an optimum is achieved according to a predetermined criterion. These remuneration conditions can then be determined or stipulated as the optimum conditions.

The exchange of electrical energy between the energy subsystems is subsequently controlled in accordance with the optimum conditions. The control of the exchange of electrical energy can additionally be controlled in accordance with the respective supply data of the energy subsystems. For example, the optimum conditions represent a price for which an optimum is achieved for the exchange of energy (in particular according to the predetermined criterion). The exchange of electrical energy between the energy subsystems can then be effected at the price stipulated by the optimum conditions and in accordance with the amounts of energy stipulated by means of the supply data. In general, the control of the exchange of electrical energy can be effected such that the individual energy subsystems provide precisely that or no more than that amount of energy identified for reception or provision by means of the supply data. In particular, the exchange of electrical energy is controlled such that each of the energy subsystems receives or provides that amount of energy stipulated for remuneration conditions corresponding to the optimum conditions in accordance with the supply data.

In some embodiments, determining of the optimum conditions may be performed by taking into consideration a maximized exchange of electrical energy. In other words, the optimum conditions are determined such that the exchange of electrical energy between the energy subsystems is maximized. This can be effected in the manner of a mathematical optimization problem. Maximizing the exchange of energy allows the effectiveness of the energy system to be increased.

In some embodiments, a demanded or offered amount of energy for at least one remuneration condition may be received on the basis of the supply data of the respective energy subsystem. In other words, the amount of energy that the energy subsystem offers or demands for the at least one remuneration condition is received on the basis of the supply data of the respective energy subsystem. In particular, respective demanded or offered amounts of energy for different remuneration conditions are received on the basis of the supply data. For example, reception is such that a first amount of energy is demanded for a first price and a second amount of energy is demanded for a second price. In particular, the second amount of energy is greater than the first amount of energy if the second price is lower than the first price. In some embodiments, the supply data can be used to determine that the respective energy subsystem receives a third amount of energy for a third price and provides a fourth amount of energy for a fourth price, the fourth price being higher than the third price.

In some embodiments, the control center may combine the supply data in order to take this as a basis for performing the determining of the optimum conditions. In other words, the optimum conditions are formed in particular on the basis of all supply data of all energy subsystems.

In some embodiments, the control center may take the supply data as a basis for determining a total amount of energy offered by the energy subsystems and a total amount of energy demanded by the energy subsystems for different remuneration conditions. For example, it may be determined what total amount of energy is offered by the energy subsystems at what price and what total amount of energy is demanded by the energy subsystems at what price. In particular, total in this instance means cumulated over all energy subsystems or over the supply data of all energy subsystems. It is therefore possible for respective tables of values and/or a respective trend for the total amount of energy offered and the total amount of energy demanded to be determined on the basis of the remuneration condition, in particular on the basis of a price per amount of energy. In other words, the total amount of energy offered and the total amount of energy demanded can each be a function of the remuneration conditions, in particular of the price per amount of energy. This provides an overview of the demand and supply of the energy subsystems.

In some embodiments, the respective supply data may comprise a price elasticity curve for the respective energy subsystem. Such a price elasticity curve can indicate the amount of electrical energy offered or demanded by the respective energy subsystem as a function of the remuneration conditions, in particular the price per amount of energy. The price elasticity curve can involve a demanded amount of energy being represented by a negative value range and a provided amount of energy being represented by a positive value range. In some embodiments, a demanded amount of energy can also be represented by the positive value range and the provided amount of energy can be represented by the negative value range. In general, demanded and provided amounts of energy can be distinguished on the basis of their arithmetic sign. This results in it being possible to indicate the supply conditions.

In some embodiments, the supply data can be combined for example by adding the price elasticity curves. In some embodiments, the control center may combine, in particular add, the price elasticity curves of the energy subsystems. For this purpose, the price elasticity curves can each be divided into an area representing the demanded amount of energy and an area representing the offered amount of energy. These two areas can then each be added separately to the total amount of energy offered and the total amount of energy demanded. This results in two price elasticity curves that characterize the total amount of energy offered and the total amount of energy demanded.

In some embodiments, the optimum conditions may stipulate the same remuneration conditions for each of the energy subsystems. In particular, it is stipulated that the exchange of electrical energy between the energy subsystems results in the energy being exchanged in accordance with the same remuneration conditions in each case, namely the optimum conditions. In other words, the optimum conditions are binding as remuneration conditions for all energy subsystems in the energy system. For example, all energy subsystems exchange the respective amount of energy at the same price predefined by the optimum conditions.

In some embodiments, the cited method steps each may be performed in succession for successive discrete time intervals. In this case, there is in particular provision for respective supply data to be received from each of the subsystems by the control center for each of the time intervals. Respective supply data are thus received from each individual energy subsystem for each of the time intervals. The optimum conditions can then be determined for each of the time intervals.

The exchange of electrical energy on the basis of the optimum conditions may then be effected in particular in the time interval for which the optimum conditions and the supply data used to determine the optimum conditions are valid. The optimum conditions and a plan for the exchange of electrical energy can already be determined in advance before the beginning of a respective discrete time interval. For example, the cited planning is performed for each of the discrete time intervals 24 hours, 12 hours, 6 hours, 4 hours, 2 hours, 1 hour, 30 minutes, 15 minutes, or 5 minutes in advance already. The cited method steps may be performed iteratively for the successive discrete time intervals. This means that only after completion of the planning of one of the time intervals is the next time interval planned. This results in a particularly high level of flexibility.

In some embodiments, the respective supply data may generally have validity only for a single one of the time intervals and for the determining of the optimum conditions to be performed in succession for successive discrete time intervals in each case on the basis of the supply data that are valid for the respective time interval. As described previously, this is in particular effected iteratively. This results in a particularly high level of planning certainty, since the plans for preceding time intervals are already known in this case. The fact that the respective supply data generally have validity only for one time interval means that they can be delivered for a specific time interval. In some embodiments, supply data that are permanently valid or that are valid for a longer time (that is to say over multiple time intervals) may be received by the control device. In this case the supply data can have validity for more than a single one of the time intervals, as described.

In particular, the optimum conditions stipulate (the same) remuneration conditions for each of the energy subsystems within one of the discrete time intervals.

In some embodiments, one of the energy subsystems to determine the exchange of electrical energy in one or more time intervals that precede a subsequent time interval and to use said exchange of energy to create respective supply data for the subsequent time interval. In other words, the exchange of electrical energy in the one or more preceding time intervals followed by the subsequent time interval can be determined and used to create the respective supply data for the subsequent time interval. In other words, the exchange of electrical energy in preceding time intervals can be used for creating or determining the supply data for a subsequent time interval. The preceding time intervals can be in the future. In this case the exchange of electrical energy for the preceding time intervals that are in the future can be simulated or calculated. This simulation or calculation can be effected iteratively on the basis of the exchange of electrical energy for the applicable time intervals that has already been stipulated on the basis of the optimum conditions. In some embodiments, the exchange of electrical energy can be measured for preceding time intervals that have already passed. Overall, the cited features allow the exchange of electrical energy to be controlled in a particularly easily calculable manner, since the individual time intervals are based on one another.

In some embodiments, a respective state of the energy subsystems after the exchange of electrical energy is determined. This can be simulated or calculated in advance already or measured after the exchange has been made. This state of the energy systems after the exchange of electrical energy can in turn be used to plan a subsequent time interval (in particular in regard to supply data, optimum conditions and resultant exchange of electrical energy).

In some embodiments, supply data may be provided and/or received for a time interval that is directly subsequent to a preceding time interval only after the exchange of the electrical energy between the energy subsystems for the preceding time interval has been determined. In other words, the exchange of electrical energy for the preceding time interval is stipulated first and only then are the supply data for the subsequent time interval received. This allows the discrete time intervals to be planned in succession.

In some embodiments, a control center may be configured to perform a method as described in the present application. In particular, the control center can be a computing unit, in particular a server.

In some embodiments, an energy system includes:
multiple control units for controlling a respective energy subsystem with regard to an exchange of electrical energy of the subsystem with other energy subsystems, and
a control center for receiving respective supply data from the energy subsystems, wherein the supply data comprise respective remuneration conditions of the applicable energy subsystem for receiving and/or providing electrical energy, for determining optimum conditions for all energy subsystems of the energy system on the basis of the supply data and for controlling an exchange of electrical energy between the energy subsystems on the basis of the optimum conditions. In particular, the energy system comprises the aforementioned control center, which is configured to perform a method as described in the present application.

The energy subsystems can be part of the energy system. In some embodiments of the energy system, the control units are regarded as part of the energy system, but the energy subsystems are not.

The control centers and the energy system described herein are each also developed by features as were already disclosed in association with the methods. For reasons of conciseness these features are not listed again at this juncture for the control center and the energy system.

Some embodiments include a computer program loadable directly into a memory of a control center, having program code means in order to carry out the steps of the method when the program is executed in the control center. The computer program implements the method on a control center when it is executed on the control center. In some embodiments, there is a storage medium having electronically readable control information stored thereon that comprises at least the cited computer program and is designed such that it performs the method when the storage medium is used in a control center. The storage medium can be configured for the digital or analog storage of data, for example. The storage medium may be capable of being written to once or multiple times and can be volatile or nonvolatile.

FIG. 1 uses a block diagram to show an overview of multiple control units 4 and a control center 2, which together are part of an energy system 1. FIG. 1 moreover shows multiple energy subsystems and an electrical grid 5, also called electricity grid, for example the 50 Hz interconnected grid.

The multiple control units 4 are each assigned to precisely one of the energy subsystems 3. The control units 4 are configured to control the respective associated energy subsystem 3. In particular, the control units 4 are configured to control the generation and consumption of electrical energy by the applicable energy subsystem 3. Moreover, the energy subsystems 3 can be configured to control provision and reception of electrical energy with the electrical grid 5. To this end, the respective control unit 4 communicates with the applicable energy subsystem 3. In particular, the control units 4 are situated at the location of the respective energy subsystem 3. The control units 4 can also be referred to as respective energy management systems of the energy subsystems 3.

Each of the energy subsystems 3 can comprise for example one or more of the following installations: photovoltaic installation, biogas installations, cogeneration unit, electrical energy storage system (in particular stationary battery store), electric vehicle, wind generator. Additionally, the energy subsystems 3 can comprise consumers of electrical energy such as for example industrial installations, cooking appliances, washing machines or arbitrary household appliances. The control units 4 can be control computers of the respective energy subsystems 3. The energy subsystems 3 of the energy system 1 may be arranged in the same road, neighborhood, quarter, town, city, region, district or otherwise in a predefined area, in particular radius.

The energy subsystems 3 are connected to the electrical grid 5 for the purpose of exchanging electrical energy. The energy subsystems 3 are therefore indirectly each connected to one another via the electrical grid 5. In this way the energy subsystems 3 can exchange electrical energy among one another. This exchange of electrical energy between the energy subsystems 3 is controlled by the control center 2 in the present case. To this end the control units 4 are each networked to the control center 2. This networking can be provided for example via the Internet, the mobile radio network, via another radio connection or by whatever means. For example the control center 2 is a server device or a server.

Figure 2:
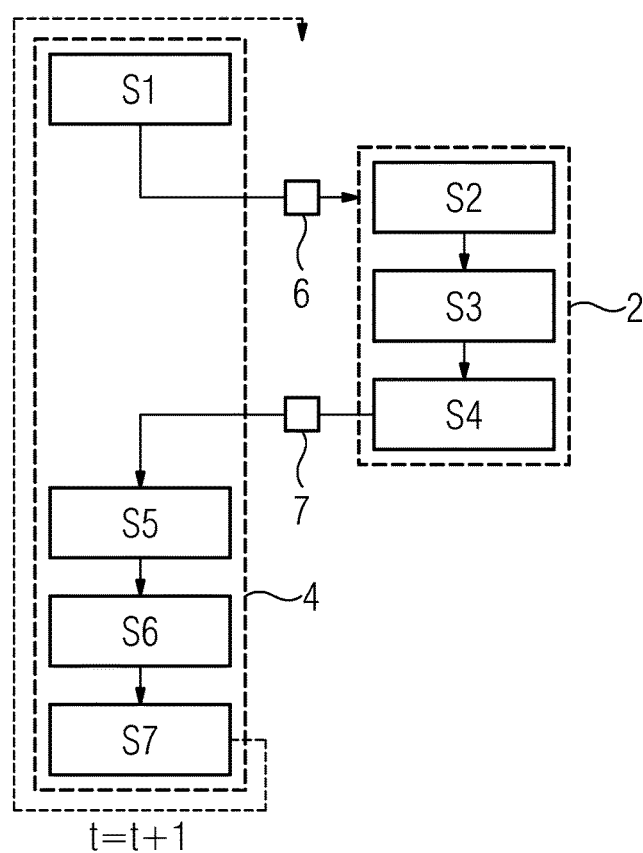
FIG. 2 shows a flowchart of an embodiment of a method incorporating teachings of the present disclosure.

FIG. 2 shows a flowchart of an exemplary embodiment of an aforementioned method for controlling the exchange of electrical energy. In a step S1 each of the control units 4 determines respective supply data 6. These supply data 6 are determined or calculated for a specific discrete time interval t in particular in real time or beforehand (for example 1 hour, 2 hours, half a day or a whole day in advance). In some embodiments, a system state of the respective energy subsystem 3 (for example a state of charge of an electrical energy store of the applicable energy subsystem 3) at the beginning of the time interval t and various predictions are taken into consideration in this instance. These predictions can relate for example to the weather, generation of electrical energy derived therefrom and/or estimates of an energy consumption within and/or outside the respective energy subsystem 3 in the applicable time interval t. The predictions can be obtained for example from a weather service and/or from another prediction facility. In some embodiments, the predictions can relate to said variables for a longer period of time too, for example half a day or a whole day. All in all, this makes it possible to determine under what remuneration conditions, that is to say at what price, the respective energy subsystem 3 provides or demands what amount of electrical energy.

Figure 3:
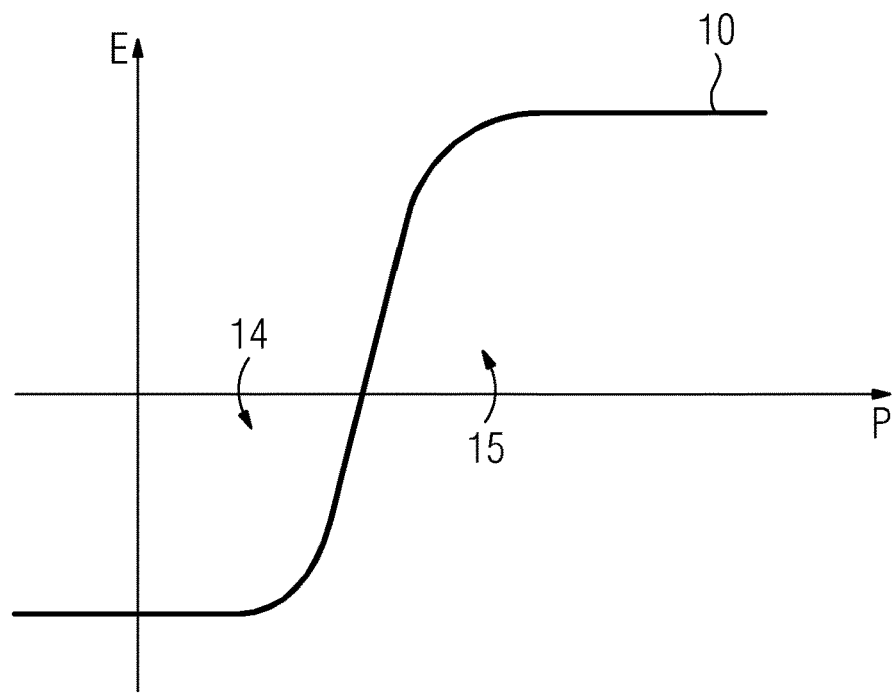
FIG. 3 shows an illustrative graph of the dependency of a demanded or provided amount of energy depending on a remuneration condition incorporating teachings of the present disclosure.

An illustrative price elasticity curve 10, also called prosumption price curve, is depicted in FIG. 3. This price elasticity curve 10 shows the amount of energy E demanded or provided by the applicable energy subsystem 3 as a function of a price P. From the illustrative price elasticity curve 10 it can be seen that the applicable energy subsystem 3 is prepared to take or provide electrical energy E in a specific amount for the applicable time interval t on the basis of a price P that is valid therefor. For a demand area 14, in which the price P is relatively low, the demand for electrical energy E by the energy subsystem 3 is relatively high. For example, the energy subsystem 3 can fill its electrical energy store at this cheap price. In a supply area 15, in which the price P is comparatively higher, the applicable energy subsystem 3 is prepared to provide electrical energy E. By way of illustration, negative values in the price elasticity curve 10 signify a demand for electrical energy and positive values signify a supply of electrical energy by the energy subsystem 3. For example, the price elasticity curve 10 can indicate the limit costs for generation and/or consumption of electrical energy by the respective energy subsystem 3 in the time interval t.

The supply data 6 are transmitted to the control center 2 by the respective control units 4. In other words, the control center 2 receives the supply data 6 from the energy subsystems 3, or the control units 4, in a step S2. This is effected in particular via a data connection by means of the networking described above.

In a step S3 the control center 2 determines optimum conditions 7 on the basis of the supply data 6. In particular, the optimum conditions 7 are determined by maximizing an exchange of electrical energy between the energy subsystems 3. In this instance the individual supply data 6 from the multiple energy subsystems 3 are combined and evaluated. There can be provision for the supply data 6 included from the control units 4, or from the energy subsystems 3, to be aggregated and managed with the aim of a maximum energy turnover. In particular, the aggregated supply data 6, in particular split into offered amounts of energy and demanded amounts of energy, will be used as secondary conditions in an optimization problem that is solved by the aim of the maximized exchange of electrical energy.

Figure 4:
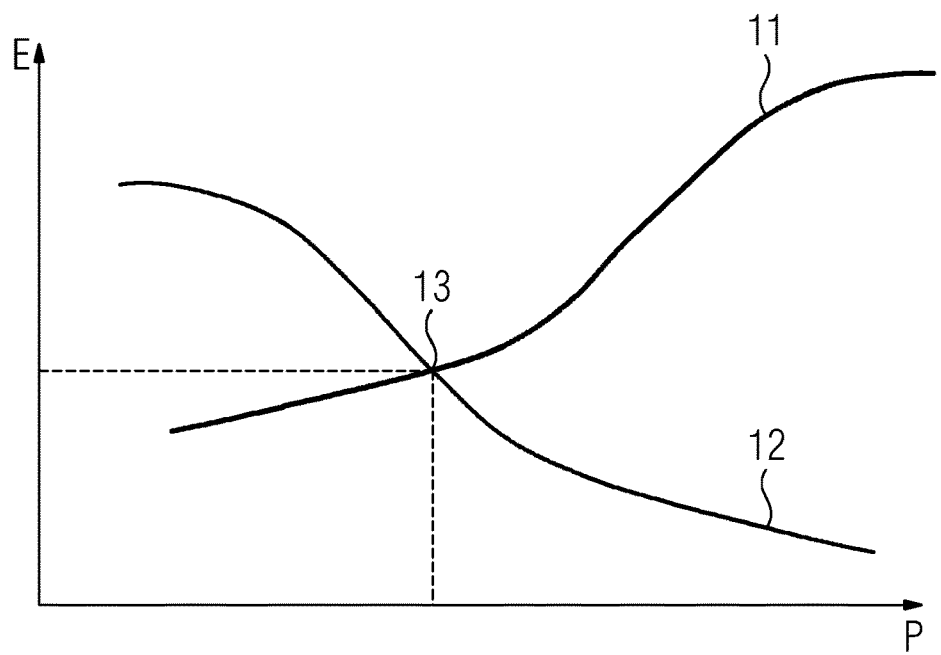
FIG. 4 shows an illustrative graph of a total amount of energy offered and a total amount of energy demanded in an energy system.

For example, in this instance a total amount of energy offered 11 by the energy subsystems 3 and a total amount of energy demanded 12 by the energy subsystems 3 are determined. These two amounts of energy 11, 12 can each be determined on the basis of price. An illustrative trend for the two amounts of energy 11 and 12 is shown in FIG. 4. This plots the total amount of energy offered 11 and the total amount of energy demanded 12 as a function of price P. The distributions for the two amounts of energy 11, 12 can be formed from the respective price elasticity curves 10 of the multiple energy subsystems 3. In particular, the total amount of energy demanded 12 is determined by adding the demand area 14, which presents a demand for electrical energy, of the price elasticity curves 10. In the present example, in order to obtain positive values, the price elasticity curve 10 in the demand area 14 also needs to be mirrored on the P axis, or multiplied by −1. Analogously, the total amount of energy offered 11 can be formed by adding the supply areas 15 of the price elasticity curves 10 of all energy subsystems 3.

It is naturally conceivable for a similarly detailed price elasticity curve 10 not to be formed or received for all energy subsystems 3. It is also possible for some of the energy subsystems 3 to indicate values only for some remuneration conditions, that is to say prices per kilowatt hour of electrical energy. In particular in the case of domestic energy subsystems 3 associated with an individual household, the supply data 6 can have individual values for different remuneration conditions.

In line with the example shown in FIG. 4, the optimum conditions 7 are determined from the two amounts of energy 11, 12, that is to say the total amount of energy offered 11 and the total amount of energy demanded 12. In general, determining the optimum conditions can be regarded as an optimization problem. The present optimization problem involves the amount of energy exchanged being maximized. It should be borne in mind that no more energy can be exchanged than is simultaneously offered and demanded for specific remuneration conditions (in particular price). In the present example, the maximum amount of energy exchanged is at the point of intersection 13. In the present graph, this is the point of intersection 13 between total amount of energy offered 11 and total amount of energy demanded 12. In the present exemplary embodiment the price associated with the point of intersection is stipulated as the price for the optimum conditions 7.

In a step S4, the exchange of electrical energy is controlled in accordance with the optimum conditions 7. In this instance the control center 2 actuates in particular each of the control units 4 such that the control units 4 in turn cause the energy subsystems 3 to provide or receive the amount of energy that was stipulated in the supply data 6 for remuneration conditions corresponding to the optimum conditions 7. In particular, this is accomplished by virtue of the optimum conditions 7 and/or a net energy budget being transmitted to the energy subsystems 3 or the control units 4 thereof. Electrical energy is exchanged in particular via the electrical grid 5.

In a step S5 the control units 4 receive the optimum conditions 7 and/or the net energy budget. On the basis of this, the operation of the respective energy subsystem 3 is optimized by the applicable control unit 4 in a step S6. This optimization can be applied during the time interval t and/or during preceding time intervals. Additionally, predictions such as for example weather and/or energy consumptions within and/or outside the energy subsystem 3 are taken into consideration for this optimization. Moreover, time intervals other than the discrete time interval t can be taken into consideration for this optimization.

In a further step S7, a system state of the respective energy subsystem 3 at the end of the time interval t is determined. This can be effected, for example, by measurement as soon as the time interval t has actually elapsed. This is the case in particular if the present method, in particular steps S1 to S7, is performed in real time. In some embodiments, the system state can be simulated or calculated. This can also be referred to as model-based determination. This may be advantageous in particular if the method, in particular steps S1 to S7, is performed before the time interval t occurs.

The system state determined in step S7 can be used as a basis for a next time interval t+1. For the time interval t+1, the same method steps as for the time interval t are performed in analogous fashion. In other words, the present method is performed iteratively. This means that the preceding iteration step (time interval t) can be used in each case as a basis for the subsequent iteration step (time interval t+1).

The fact that a coordination of the energy subsystems 3 as provided by the present method is discretized over time (namely according to the time intervals t) and the method is performed for each of the time intervals t in succession allows flexibilities in the generation and consumption of electrical energy to be assessed much more easily and in a much better way by the respective control units 4 for a time interval t under consideration. The flexibility of the energy system 1 is increased overall in comparison with the prior art. This is due to the system state of a respective energy subsystem 3 at the beginning of a time interval t being known (possibly in an advance mode, also called day-ahead mode) or at least being able to be assessed on the basis of a model. The time intervals t can each extend over a stipulated period, in particular one that is identical among them. This period can be 5 minutes, 15 minutes, 30 minutes or 1 hour, for example.

In particular, the energy subsystems 3 determine the exchange of energy in one or more time intervals t−1 preceding the time interval t and use said exchange of energy to create the applicable supply data 6 for the time interval t. Alternatively or additionally there is provision for supply data 6 to be received for a time interval t+1 that is directly subsequent to the time interval t only after the exchange of the energy between the energy subsystems 3 for the preceding time interval t has been determined.

In some embodiments, a method for coordinating multiple energy subsystems 3 by means of their control units 4 is described. Although this method obliges the control units 4 to set their flexibility (more accurately price elasticity) for a specific time interval t beforehand, the combination of multiple control units 4 and the underlying energy subsystems 3 thereof can achieve better costs or efficiencies overall, that is to say in total, for the entire energy system 1 and also improve the individual interests of the individual energy subsystems 3 (optimization for a respective energy subsystem 3) as a result of the interaction with the other energy subsystems 3. The special feature is in particular the splitting of the coordination according to the time intervals t and the progressive handling of the latter, which means that flexibilities (for example elasticities) need be assessed only for a respective time interval t and not for a longer period. This allows the flexibilities that exist to be assessed "more generously". Moreover, the risk of calculating an operational plan that cannot be carried out afterwards from a technical point of view is reduced.

In some embodiments, the method can be used for different systems in extremely different contexts (examples: electricity, heat, cold on different scales, e.g. road, neighborhood, quarter, city or region, but also in "behind-the-meter" systems, for which the actual optimization problem would be too complex to solve). The complexity of the central coordination platform scales linearly with the number of subscribers and is manageable on the whole. The mechanism described allows information about the system state of the respective energy subsystem 3, or the control unit 4 thereof, to flow both forward and backward within the respective prediction horizon for the time interval t currently under consideration. The system state can be e.g. the state of charge of an energy store. In the central coordination platform, information about flexibilities flows forward in time from preceding time intervals t-x to the time interval t currently under consideration.

What is claimed is:

1. A method for controlling an exchange of energy in an energy system having multiple energy subsystems each connected to one another for the purpose of exchanging energy, the method comprising:

receiving supply data at a control center from the energy subsystems, wherein the supply data comprise respective remuneration conditions of each energy subsystem for receiving and/or providing energy represented by a price elasticity curve for the respective energy subsystem mapping a respective amount of energy offered and a respective amount of energy demanded at any given price point;

determining optimum conditions on the basis of the supply data and at least one prediction for future conditions; and controlling the exchange of energy between the respective energy subsystems on the optimum conditions with the control center;

wherein the future conditions include at least one condition selected from the group consisting of: weather, availability of power affected by weather conditions, and estimates of energy consumption within one or more of the energy subsystems.

2. The method as claimed in claim 1, wherein determining the optimum conditions includes taking into consideration a maximized exchange of energy.

3. The method as claimed in claim 1, further comprising receiving a demanded or offered amount of energy for at least one remuneration condition based on the respective supply data of the respective energy subsystem.

4. The method as claimed in claim 1, wherein the control center uses the supply data to determine a total amount of energy offered by the energy subsystems and a total amount of energy demanded by the multiple energy subsystems for at least two different remuneration conditions.

5. The method as claimed in claim 1, wherein the control center combines, in particular adds, the price elasticity curves of the energy subsystems.

6. The method as claimed in claim 1, wherein the optimum conditions stipulate the same remuneration conditions for each of the energy subsystems.

7. The method as claimed in claim 1, wherein the method steps are each performed in succession for successive discrete time intervals.

8. The method as claimed in claim 7, wherein:
the supply data have validity only for a single one of the time intervals; and
determining of the optimum conditions is performed in succession for successive discrete time intervals in each case based on valid the time interval.

9. The method as claimed in claim 1, wherein one of the energy subsystems determines the exchange of energy in one or more time intervals and uses said exchange of energy to create respective supply data for a subsequent time interval.

10. The method as claimed in claim 1, further comprising receiving supply data for a time interval directly subsequent to a preceding time interval only after the exchange of the energy between the energy subsystems for the preceding time interval has been determined.

11. A control center programmed to:
receive supply data at a control center from multiple energy subsystems, wherein the supply data comprise respective remuneration conditions for each of the multiple energy subsystems for receiving and/or providing energy represented by a price elasticity curve for each energy subsystem mapping a respective amount of energy offered and a respective amount of energy demanded at any given price point;

determine optimum conditions on the basis of the supply data and at least one prediction for future conditions; and control an exchange of energy between the multiple energy subsystems on the basis of the optimum conditions with the control center;

wherein the future conditions include at least one condition selected from the group consisting of: weather, availability of power affected by weather conditions, and estimates of energy consumption within one or more of the energy subsystems.

12. An energy system comprising:

multiple control units, each control unit assigned for controlling a respective energy subsystem with regard to an exchange of energy of the respective energy subsystem with other energy subsystems; and a control center programmed to:

receive supply data from the energy subsystems, wherein the supply data comprise respective remuneration conditions of the respective energy subsystem for receiving and/or providing energy represented by a price elasticity curve for the respective energy subsystem mapping a respective amount of energy offered and a respective amount of energy demanded at any given price point;

determining optimum conditions for all energy subsystems of the energy system using the supply data and at least one prediction for future conditions; and control an exchange of energy between the respective energy subsystems on the basis of the optimum conditions;

wherein the future conditions include at least one condition selected from the group consisting of: weather, availability of power affected by weather conditions, and estimates of energy consumption within one or more of the energy subsystems.

* * * * *